(12) United States Patent
Busnaina et al.

(10) Patent No.: US 7,563,500 B2
(45) Date of Patent: Jul. 21, 2009

(54) FUNCTIONALIZED NANOSUBSTRATES AND METHODS FOR THREE-DIMENSIONAL NANOELEMENT SELECTION AND ASSEMBLY

(75) Inventors: Ahmed Busnaina, Ashland, MA (US); Glen P. Miller, Lee, NH (US)

(73) Assignees: Northeastern University, Boston, MA (US); University of New Hampshire, Durham, NH (US)

( * ) Notice: Subject to any disclaimer, the term of this patent is extended or adjusted under 35 U.S.C. 154(b) by 64 days.

(21) Appl. No.: 10/928,745

(22) Filed: Aug. 27, 2004

(65) Prior Publication Data
US 2005/0061451 A1    Mar. 24, 2005

Related U.S. Application Data

(60) Provisional application No. 60/498,041, filed on Aug. 27, 2003.

(51) Int. Cl.
*B32B 3/24* (2006.01)
(52) U.S. Cl. .................. 428/138; 428/156; 977/781; 977/782
(58) Field of Classification Search .............. 428/138, 428/156; 977/781, 782
See application file for complete search history.

(56) References Cited

U.S. PATENT DOCUMENTS

| | | | |
|---|---|---|---|
| 6,827,979 B2 * | 12/2004 | Mirkin et al. | 427/256 |
| 7,180,308 B2 * | 2/2007 | Getty et al. | 324/691 |
| 2003/0068446 A1 * | 4/2003 | Mirkin et al. | 427/430.1 |
| 2003/0198956 A1 | 10/2003 | Makowski et al. | |
| 2004/0005258 A1 * | 1/2004 | Fonash et al. | 422/271 |
| 2004/0076757 A1 * | 4/2004 | Jacobson et al. | 427/402 |

OTHER PUBLICATIONS

Lewenstein et al., "High Yield Selective Placement of Carbon Nanotubes on Pre-Patterned Electrodes", Nano Letters, vol. 0, No. 0, A-D, American Chemical Society, (2002).
Teredesai et al., "Pressure-induced Reversible Transformation in Single-Wall Carbon Nanotube Bundles Studies by Raman Spectroscopy", Chemical Physical Letter, vol. 319, pp. 296-302, (200).

(Continued)

*Primary Examiner*—William P Watkins, III
(74) *Attorney, Agent, or Firm*—Weingarten, Schurgin, Gagnebin & Lebovici LLP

(57) ABSTRACT

The present invention provides a functionalized nanosubstrate or "nanotemplate" that is useful for selectively assembling nanoelements across a large area. The nanotemplate is capable of guiding the massive parallel assembly of nanoelements to fabricate a three-dimensional nanostructure. Nanoelements can also be transferred at a high-rate from the template to a recipient substrate. Examples of these nanoelements include, but are not limited to, carbon nanotubes, nanocrystals, dendrimers, nanoparticles, nanowires, biological materials, proteins, molecules and organic nanotubes. The invention also provides a nanotemplate combined with selectively assembled nanoelements. The invention encompasses methods for functionalizing a nanosubstrate. These methods involve providing a substrate having a known topology and polymerizing a monomer on its surface. Methods for selecting nanoelements and guiding their self-assembly are also disclosed. The invention further provides a method for modifying and transferring assembled nanoelements to a recipient substrate.

26 Claims, 8 Drawing Sheets

OTHER PUBLICATIONS

Pohl et al., "Thermal Vibrations of Two-Dimensional Vacancy Island Crystal in Strained Metal Film", Surface Science, vol. 433-435, pp. 506-511, (1999).

Lauristen et al., "Atomic-Scale Structure of Co-Mo-S Nanoclusters in Hydrotreating Catalysts", Journal of Catalysts, vol. 197, pp. 1-5, (2001).

de La Figuera et al., "Multiplication of Threading Dislocations in Strained Metal Films Under Sulfur Exposure", Surface Science, vol. 433-435, pp. 93-98, (1999).

Suo et al., "Forces That Drive Nanoscale Self-Assembly on Solid Surfaces", Journal of Nanoparticle Research, vol. 2, pp. 333-244, (2000).

Ni et al., "A Combined Computational and Experimental Study of Ion-Beam Modification of Carbon Nanotube Bundles", J. Phys. Chem, vol. 105, pp. 12719-12725, (2001).

* cited by examiner

FUNCTIONALIZED NANOSUBSTRATES AND METHODS FOR THREE-DIMENSIONAL NANOELEMENT SELECTION AND ASSEMBLY

CROSS REFERENCE TO RELATED APPLICATIONS

This application claims the priority of U.S. Provisional Application No. 60/498,041 filed Aug. 27, 2003 and entitled, PRECISE MASSIVE SELECTION AND PARALLEL THREE-DIMENSIONAL ASSEMBLY OF CARBON NANOTUBES AND NANOELEMENTS, which is hereby incorporated by reference herein.

BACKGROUND OF THE INVENTION

The fields of nanoscience and nanotechnology generally concern the synthesis, fabrication and use of nanoelements and nanostructures at atomic, molecular and supramolecular levels. The nanosize of these elements and structures offers significant potential for research and applications across the scientific disciplines, including materials science, physics, chemistry, computer science, engineering and biology. Biological processes and methods, for example, are expected to be developed based entirely on nanoelements and their assembly into nanostructures. Other applications include developing nanodevices for use in semiconductors, electronics, photonics, optics, materials and medicine.

One class of nanoelements that has garnered considerable interest consists of carbon nanotubes. P. Teredesai et al., "Pressure-Induced Reversible Transformation in Single-Walled Carbon Nanotube Bundles Studied by Raman Spectroscopy," Chem. Phy. Let., 319, 296-302 (2000). A carbon nanotube has a diameter on the order of nanometers and can be several micrometers in length. These nanoelements feature concentrically arranged carbon hexagons. Carbon nanotubes can behave as metals or semiconductors depending on their chirality and physical geometry. Other classes of nanoelements include, for example, nanocrystals, dendrimers, nanoparticles, nanowires, biological materials, proteins, molecules and organic nanotubes.

Although carbon nanotubes have been assembled into different nanostructures, convenient nanotools and fabrication methods to do so have not yet been developed. One obstacle has been the manipulation of individual nanoelements, which is often inefficient and tedious. This problem is particularly challenging when assembling complex nanostructures that require selecting and ordering millions of nanoelements across a large area.

To date, nanostructure assembly has focused on dispersing and manipulating nanoelements using atomic force or scanning tunneling microscopic methods. Although these methods are useful for fabricating simple nanodevices, neither is practical when selecting and patterning, for example, millions of nanoelements for more complex structures. As an alternative, lithographic methods have been developed to modify substrates used for assembling nanoelements. Examples of these lithographic methods include, but are not limited to, electron-beam, ion-beam, extreme ultraviolet or soft lithographies. These methods, however, remain incapable of manipulating individual nanoelements. The development of nanomachines or "nanoassemblers" which are programmed and used to order nanoelements for their assembly holds promise, although there have been few practical advancements with these machines.

Self-assembly is another method for nanodevice fabrication that does not require nanoelements to be individually manipulated. In self-assembly, nanoelements are designed to naturally organize into patterns by atomic, molecular and supramolecular particle interactions. Self-assembled monolayers, for example, are formed by the spontaneous arrangement of molecules into monomolecular layered structures. These structures can be stabilized by van der Waals forces or noncovalent bonding. Self-assembled monolayers, however, have been problematic when used to transfer nanoelements from one nanosubstrate to a recipient substrate. Although particle interactions can be modified to affect their transport, optical and electrical properties, controlling nanoelement orientation is also a challenge in self-assembly methods. Similarly, nanoscience has been incapable of manipulating particle interactions to reproducibly assemble hundreds of nanodevices.

The advancement of nanotechnology requires millions of nanoelements to be conveniently selected and simultaneously assembled. Three-dimensional nanostructure assembly also requires that nanoelements be ordered across a large area. At present, the above methods have yet to met these requirements.

SUMMARY OF THE INVENTION

The present invention is directed to a functionalized nanosubstrate or "nanotemplate" that is useful for selectively assembling nanoelements. The substrate is functionalized to allow nanoelements to be conveniently transferred to a recipient substrate or material. The invention is also directed to a nanotemplate combined with selectively ordered and assembled nanoelements. The nanoelements are preferably massively assembled in parallel by the nanotemplate. These nanoelements can include, for example, carbon nanotubes, nanocrystals, dendrimers, nanoparticles, nanowires, biological materials, proteins, molecules and organic nanotubes.

Prior to functionalization, the substrate can be a silicon wafer having a known topology. This topology may include an array of features such as, for example, depressions or recesses. These features are formed by using top-down lithographic methods such as electron-beam, ion-beam, extreme ultraviolet or soft lithographies. Similarly, the substrate can feature an array of atomic or molecular vacancy islands on a strained metal film, an example of which can be formed by exposing a submonolayer of silver film on Ru(0001) to sulfur. Nanosubstrates can also feature nanoparticle islands or protuberances created by particle adsorption or deposition onto the substrate surface. These particles self-assemble, naturally organizing across the substrate due to their interactions with one another.

Modifying or functionalizing a nanosubstrate involves forming a physical layer or film on the substrate surface. This layer can, for example, be a photopolymerized pi-stacking, organic monomer. The nanotemplate can also have multiple layers formed by the monomer. The layer or multi-layer generally has a thickness that preserves the topology of the nanosubstrate, forming channels across the surface features. An array of these channels pattern the nanotemplate. The characteristics of the channels can depend on the topology of the underlying substrate and the nature of the modifying layer.

Specifically, nanotemplate channels can have a diameter and depth that correspond to the underlying topology of the substrate. The depth of the channels can also be changed depending on the type of monomer adsorbed on the substrate. Chemical and physicochemical properties of the channels can also depend on the type of modifying layer or multi-layer. For example, nanotemplate channels may preferably attract and noncovalently bind to a plurality of nanoelements. These characteristics affect the selection of nanoelements and guide their self-assembly across the nanotemplate. Selected nanoelements can have a binding interaction with the channels in which they are partially disposed. This interaction then affects the transfer of elements to a recipient substrate which, according to the invention, can be carried out at a high-rate.

The invention is also directed to methods for functionalizing a nanosubstrate. These methods involve providing a substrate having a known topology and polymerizing a monomer on its surface. Methods for selecting nanoelements and guiding their self-assembly are further disclosed. Finally, the invention contemplates a method for modifying and transferring assembled nanoelements to a recipient substrate.

DESCRIPTION OF THE DRAWINGS

Other features and advantages of the present invention will be apparent from the following detailed description of the invention, taken in conjunction with the accompanying drawings of which.

DETAILED DESCRIPTION OF THE INVENTION

The present invention provides a functionalized nanosubstrate or "nanotemplate" that is useful for selectively assembling nanoelements across a large area. The nanotemplate is capable of guiding the self-assembly of nanoelements to fabricate a three-dimensional nanostructure. Nanoelements can also be transferred at a high-rate from the template to a recipient substrate. Examples of these nanoelements include, but are not limited to, carbon nanotubes, nanocrystals, dendrimers, nanoparticles, nanowires, biological materials, proteins, molecules and organic nanotubes.

Figure 1:
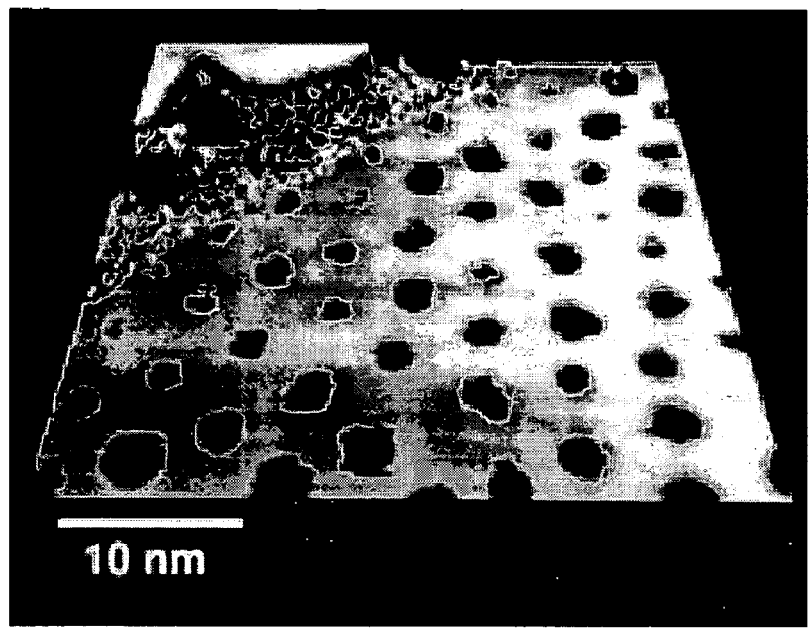
FIG. 1 is a scanning tunneling microscope (STM) image of an unfunctionalized nanosubstrate having an array of sulfur vacancy islands in a strained submonolayer Ag film on Ru(0001)

A nanotemplate can be prepared from a substrate having a known topology. Different nanosubstrate topologies include, for example, atomic and molecular vacancy islands formed by gas deposition methods. FIG. 1 is a scanning tunneling microscope (STM) image of an unmodified nanosubstrate having an array of sulfur vacancy islands in a strained submonolayer Ag film on Ru(0001). K. Pohl et al., "Thermal Vibrations of a Two-Dimensional Vacancy Island Crystal in a Strained Metal Film," Surf. Sci., 433-435, 506-511 (1999). The sulfur vacancy islands are approximately 2 nm in diameter and 5 nm apart from each other. These feature sizes and densities can also be changed by modifying the composition of the nanosubstrate and the atoms or molecules which are deposited.

Other nanotemplate embodiments can include a nanosubstrate having an array of features formed by lithographic methods. These methods are commonly used to modify the surface topology of a substrate. Although numerous lithographic methods have been developed for nanoscale applications, the invention preferably uses electron-beam, ion-beam, extreme ultraviolet or soft lithographies. Comparable methods such as holographic, nanoimprint, immersion or interference lithographies can also be used. Generally, a nanosubstrate patterned by one of the above methods features surface depressions or recesses.

Figure 2:
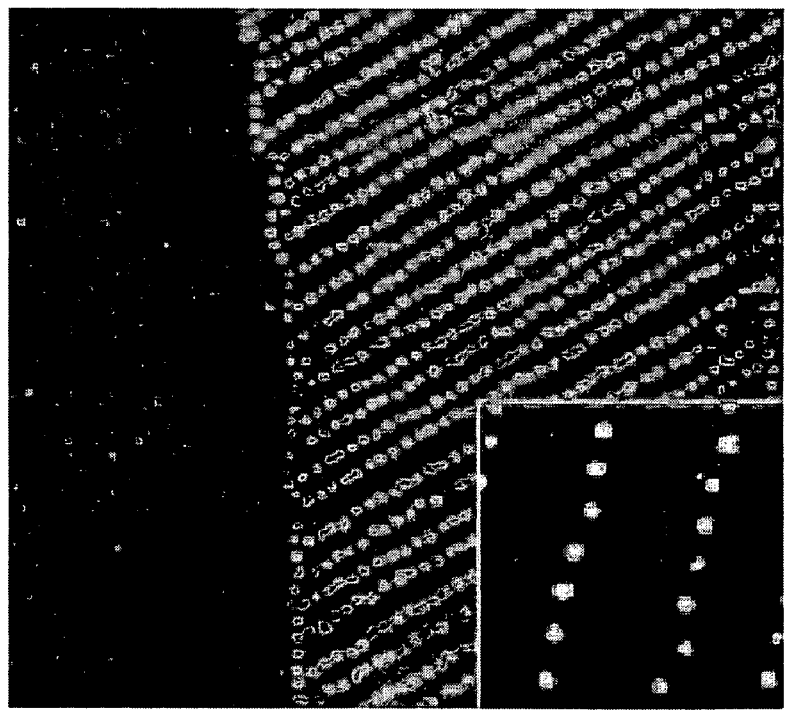
FIG. 2 is an STM image of an unfunctionalized nanosubstrate featuring self-assembled Co nanoclusters adsorbed on Au(111)

FIG. 2 is an STM image of an unfunctionalized nanosubstrate featuring self-assembled Co nanoclusters adsorbed on Au(111). J. Lauritsen et al., "Atomic-Scale Structure of Co—Mo—S Nanoclusters in Hydrotreating Catalysts," J. Catal., 197, 1-5 (2000). This substrate has protuberances on its surface rather than vacancy islands like FIG. 1. The nanosubstrate also features a "herringbone" dislocation, or reconstruction, pattern. This pattern has distinct nucleation or reactive sites for the clustering of nanoparticles. Although FIG. 2 shows cobalt clusters adsorbed on the surface of the substrate, other metals or their combinations could also be adsorbed. Alternative metals include, but are not limited to, nickel, molybdenum and chromium.

Nanosubstrates having different surface features can also be functionalized according to the invention. For example, the substrate may have metallic or organic nanoparticles, such as, polymers, on its surface. Other features or protuberances could be atoms or molecules including fullerenes and proteins. These nanoparticles can be deposited by, for example, aerosol sputtering methods. With the particles deposited on the substrate surface, particle interactions form a self-assembled particle array. These interactions include van der Waals and noncovalent forces. The particle array also reflects the size of the individual particles.

Alternative materials can also be used for a nanosubstrate. Silicon wafers, for example, are capable of being used as a substrate. These wafers can consist of self-assembled nanoparticle monolayers. According to the invention, any of these substrates can be functionalized to be a nanotemplate. Preferably, the underlying substrate of the nanotemplate has a known surface topology including features such as depressions or protuberances.

Figure 3:
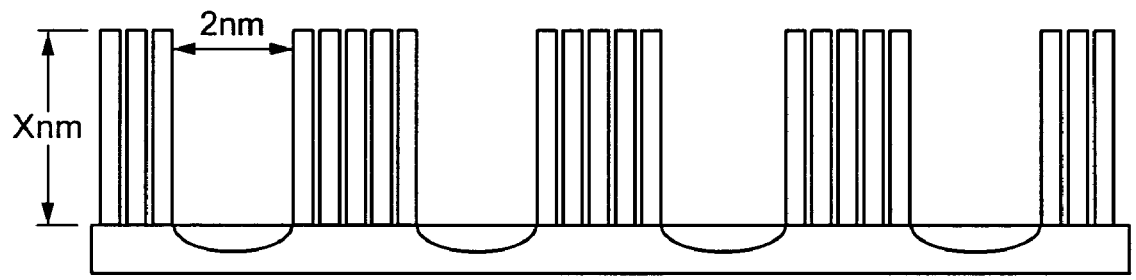
FIG. 3 is a partial representation of the nanosubstrate in FIG. 1 functionalized according to the invention by a polymer layer, forming an array of channels.

A preferred nanotemplate according to the invention is illustrated in FIG. 3. FIG. 3 is a partial representation of a functionalized nanosubstrate in which the substrate features an array of sulfur vacancy islands in a strained submonolayer Ag film on Ru(0001). As described above, these vacancy islands can be approximately 2 nm in diameter and 5 nm apart from each other. A nanosubstrate can be functionalized by depositing or dispersing a monomer on the substrate in an amount or polymerized thickness that preserves its surface topology. In FIG. 3, the sulfur vacancy islands are preserved by an organic monomer that is capable of being photopoly merized. The monomer can be aromatic and it is preferable a thiol containing compound such as, for example,

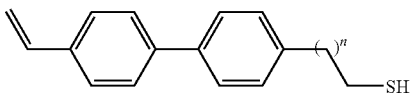

The thiol substituent (SH) preferably binds to the nanosubstrate and not its surface features. Polymerization is carried out by the styrene group, which enables the functionalizing layer or multi-layer to be rigid.

The polymerized monomer forms a layer of channels across the template surface. The nanotemplate can also have multiple polymerized layers adsorbed onto the substrate. The channels are ordered according to the topology of the underlying substrate. The channel depth depends on the topology of the substrate and the type or length of monomer polymerized on its surface. In general, deeper channels can be patterned using multiple polymer layers instead of a single layer. The diameter of each channel also reflects the feature size of a particular surface topology. Accordingly, the channels in FIG. 3 are approximately 2 nm in diameter and about 5 nm apart from one another. Based partly on their diameters, the channels are capable of selecting nanoelements dispersed on the surface of the nanotemplate.

The polymers used to functionalize a substrate have characteristic chemical and physiochemical properties which can be modified for different applications. These polymers include, for example, those that are capable of having pi-stacking, hydrophobic, hydrogen and hydrophilic binding interactions. A preferred polymer layer can be a photopolymerized pi-stacking, organic monomer. Different binding interactions can affect the noncovalent attraction among nanoelements and the nanoelement channels in which they are partially disposed. These interactions can also act to draw elements toward the channels, where they may be selectively assembled based on diameter. In addition, capillary forces can function in concert with these interactions during assembly. The selection of nanoelements is carried out as only elements having a diameter smaller than a particular channel can be disposed within that channel. This selection process is convenient when millions of differently sized nanoelements are dispersed on the surface of the nanotemplate and only elements of a specific diameter are preferred for assembly.

The different monomers used to functionalize a substrate can be polymerized by a variety of methods. These methods can include, but are not limited to, free radical polymerization, photopolymerization, anionic polymerization or cationic polymerization. One of ordinary skill in the art will appreciate that polymeric liquids can also be used to modify a substrate. These liquids include those that can, for example, be thermally polymerized or photocured.

Figure 4:
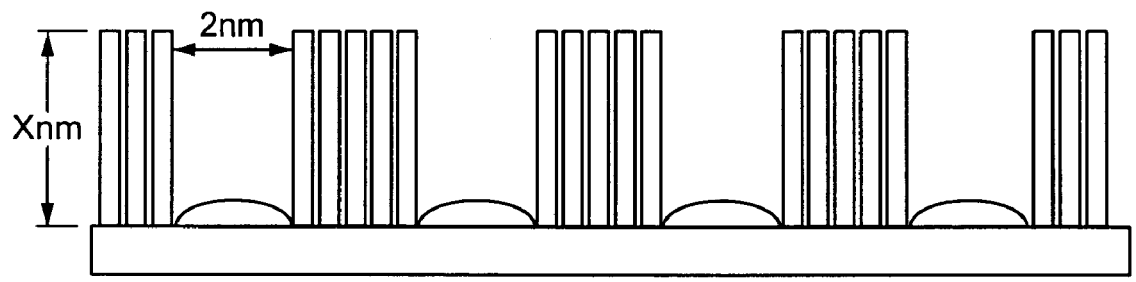
FIG. 4 is a partial representation of the nanosubstrate in FIG. 2 functionalized according to the invention by a polymer layer, forming an array of channels.

Another nanotemplate embodiment according to the invention can have an underlying substrate featuring protuberances on its surface. This embodiment is illustrated in FIG. 4 in which the underlying nanosubstrate has self-assembled Co nanoclusters adsorbed on Au(111). This substrate is functionalized by the methods describe above such that the nanotemplate has an array of channels. These channels have a feature size which corresponds to the diameter of the cobalt nanoclusters. The channels also have chemical and physiochemical properties which can vary depending on the type of monomer used during functionalization. As described for the template in FIG. 3, these channels are capable of attracting and selectively assembling different nanoelements based on size and interactive forces.

Figure 5:
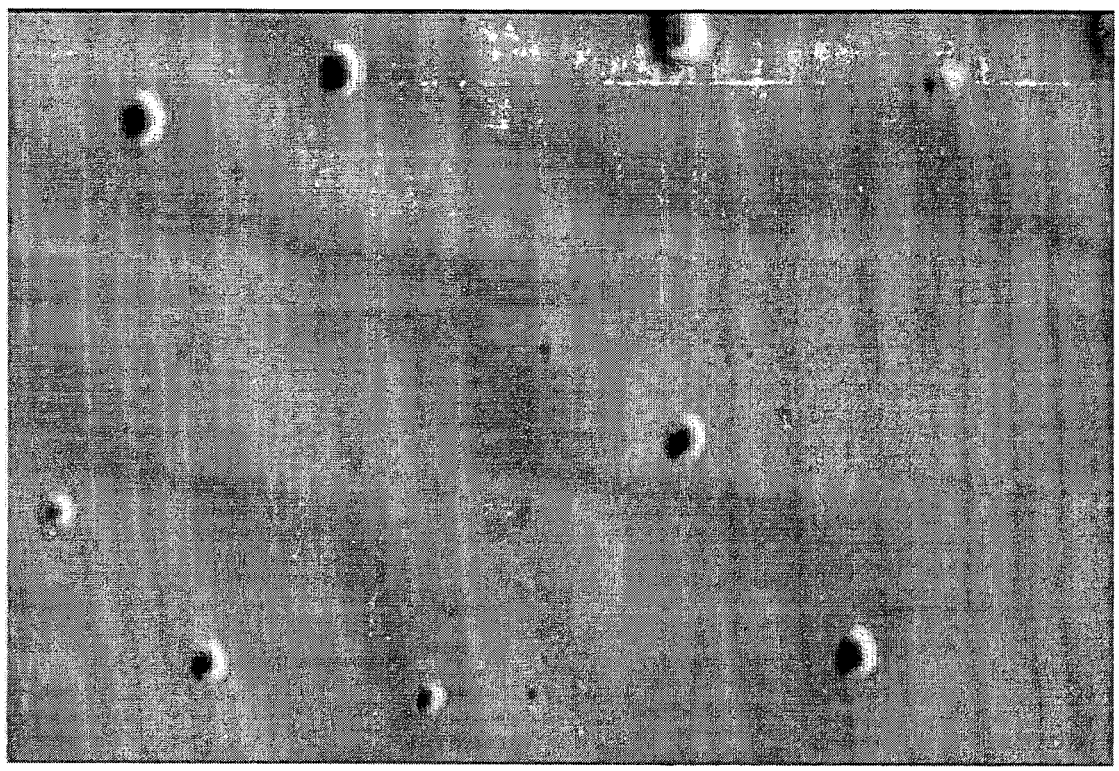
FIG. 5 is an STM image of the nanosubstrate in FIG. 1 functionalized by an organic polymer multi-layer, forming an array of channels.
Figure 6:
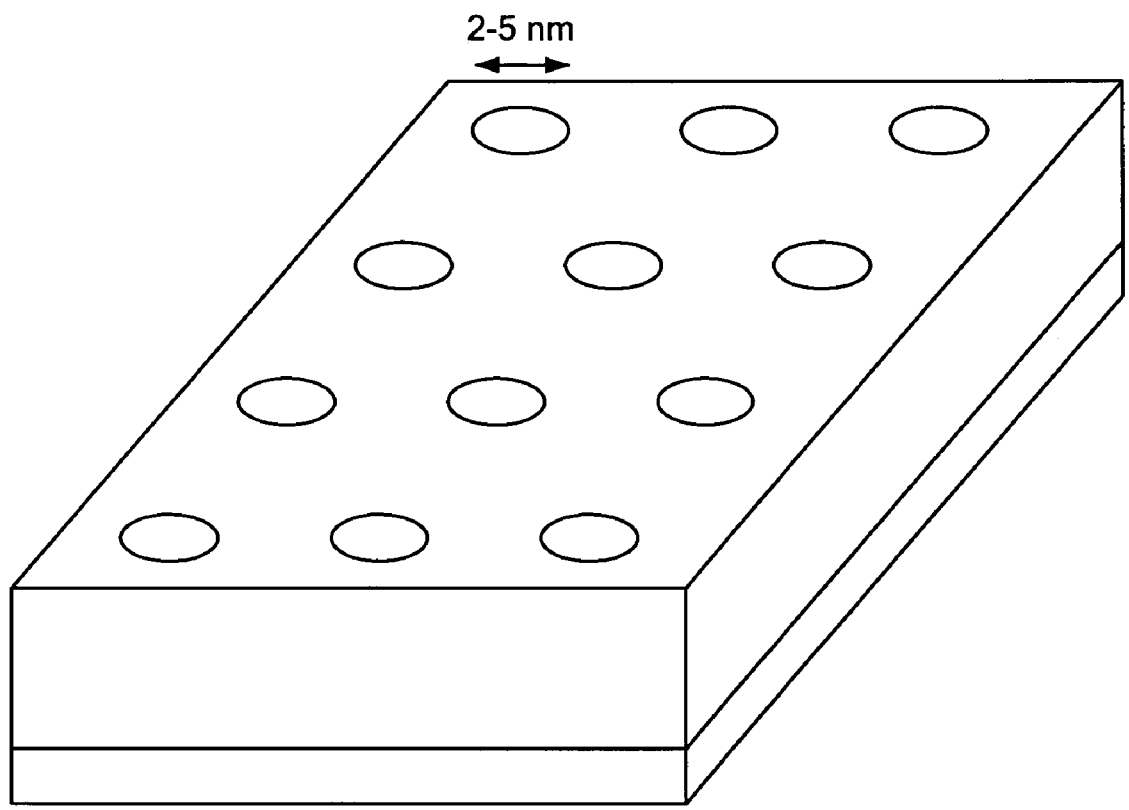
FIG. 6 is a perspective representation of the functionalized nanosubstrate in FIG. 3 or 4.

FIG. 5 is an STM image of a nanotemplate featuring an array of channels formed by an organic polymer multi-layer on the substrate of FIG. 1. The polymer layer is a polymerized organic monomer. This template can be represented by the functionalized substrate illustrated in FIG. 6. In FIG. 6, the surface topology of the underlying nanosubstrate is not shown, but this topology could feature depressions or protuberances.

Figure 7:
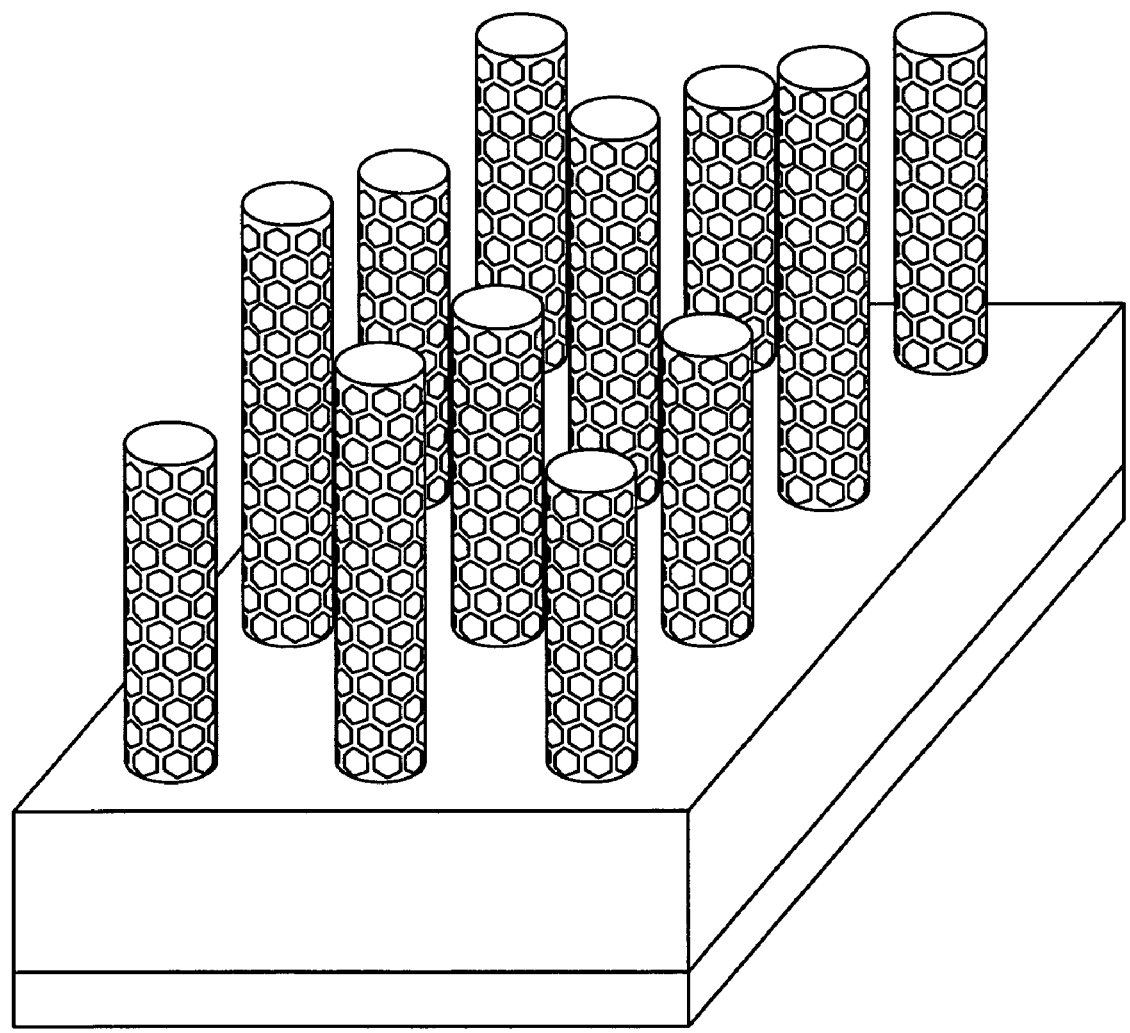
FIG. 7 is a perspective representation of the nanotemplate in FIG. 6 combined with nanoelements partially disposed within the array of channels.

As described above, nanoelements dispersed onto the template can be attracted to its channels which selectively assemble the nanoelements. FIG. 7 is a perspective representation of a nanotemplate combined with selectively assembled nanoelements. The nanoelements are shown partially disposed within the array of channels. Upper portions of the nanoelements are not in contact with the nanotemplate. Interactive forces between the nanoelements and the template channels can stabilize the elements for further processing or to transfer them to a recipient substrate. The embodiment in FIG. 7 can be used in a variety of applications such as, for example, electronic panel displays, scanning probe microscopes, electrochemical devices, molecular filtration membranes, electronic interconnects and biological material supports. These applications can be tailored based on the characteristics and properties of the nanotemplate and those nanoelements combined therewith.

Nanoelements can be dispersed or deposited on the surface of the nanotemplate via any convenient method recognized by one of ordinary skill in the art. These methods could include, for example, using a dispersing agent such as an organic solvent, polymer or surfactant to carry the nanoelements to the template.

Assembling a nanostructure may require that selected nanoelements be modified to be uniform in length. The present invention conjectures several methods that could be used to modify assembled nanoelements. As described above, the nanotemplate can stabilize selected nanoelements by interactive forces between its channels and the elements. The upper portions of the nanoelements not in contact with the channels can be modified by methods such as, for example, chemical oxidation, photochemical oxidation, ion irradiation, electron irradiation, laser ablation or oxygen plasma. These methods could also be used to modify the surface of the selected nanoelements.

Figure 8:
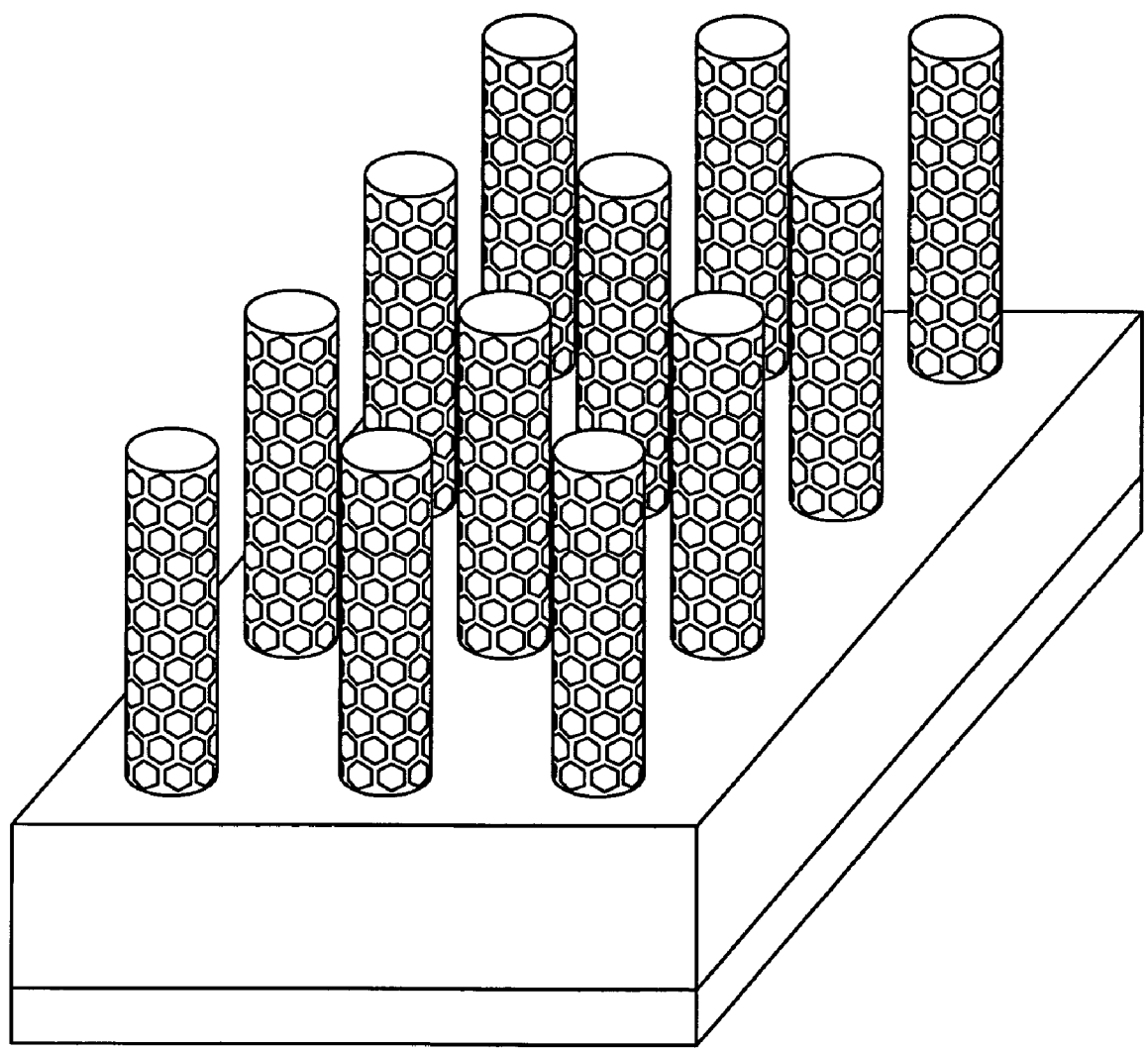
FIG. 8 is a perspective representation of the nanotemplate in FIG. 6 featuring the assembled nanoelements modified to a uniform length.

FIG. 8 is a perspective representation of a nanotemplate combined with nanoelements that have been modified to be uniform in length. These nanoelements could also be altered during modification, for example, to feature a metallic upper portion. Silver or gold, for example, can be deposited at the upper portions of the assembled nanoelements to change their properties for different applications.

Figure 9:
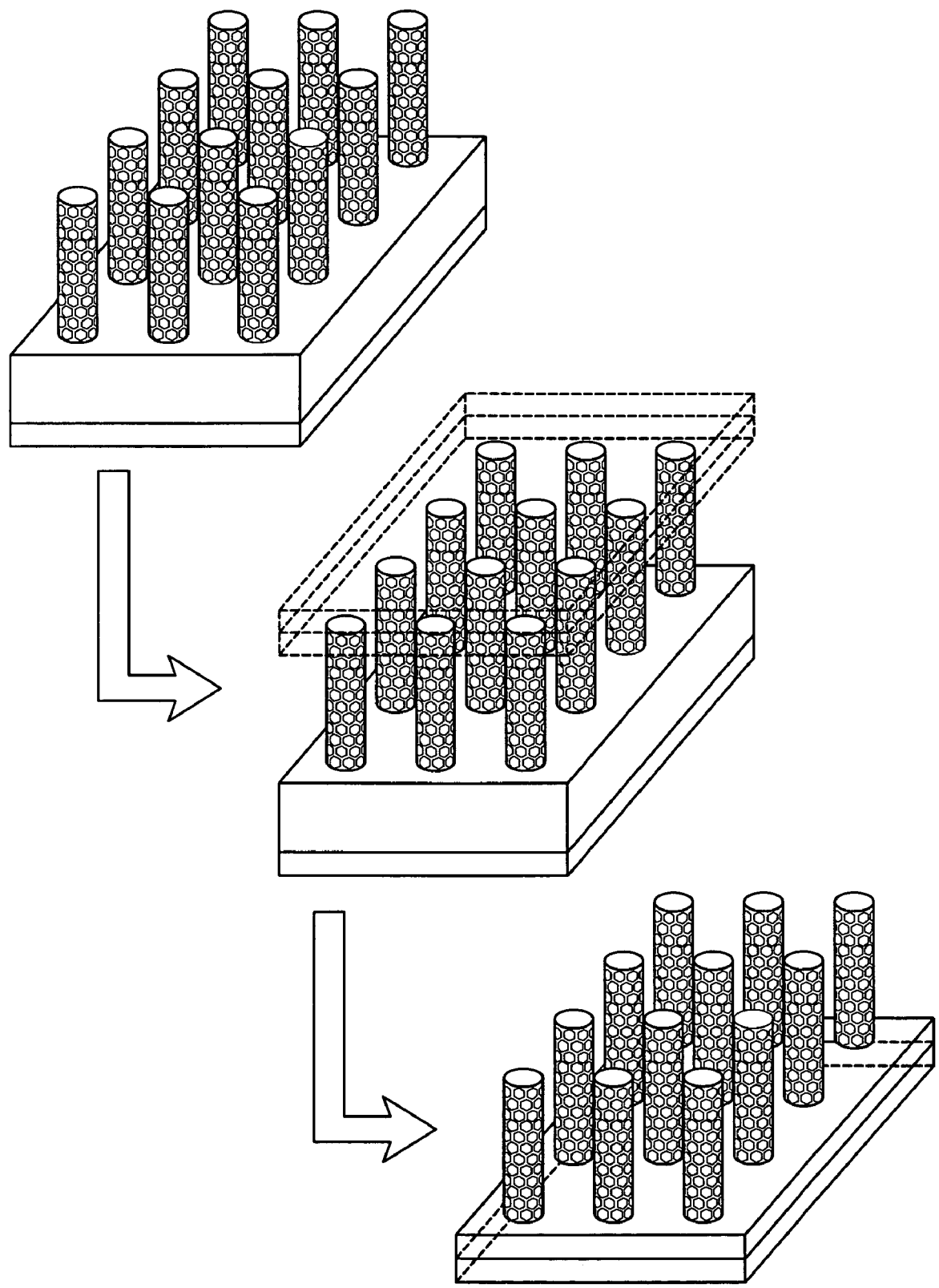
FIG. 9 is a representation of a scheme for transferring the modified nanoelements of FIG. 8 to a recipient substrate.

Nanoelements can also be transferred at a high-rate from the nanotemplate to a recipient substrate. FIG. 9 represents a scheme for transferring a large area of modified nanoelements to another substrate. In order to transfer nanoelements to the substrate, the recipient material may need to be aligned with the nanotemplate. For materials that are convenient to manipulate and control, standard nanopositioning methods could be used to bring the recipient substrate into alignment with the nanotemplate. An approximate alignment can be carried out optically, with finer adjustments made by atomic force or scanning tunneling microscopic systems.

With larger, more cumbersome recipient substrates, a different approach to alignment may be necessary. One approach could be to adopt a "bump" bonding-type method.

Bump bonding is typically used in circuit assembly to align microchips on a substrate. Adopting a method of this type to the invention involves bringing the nanotemplate into a pre-alignment contact with the recipient substrate via an alignment system, such as, for example, one of those identified above. As the nanotemplate and substrate are brought together, interactive forces distort their surfaces to draw matching features into contact. These forces can allow the alignment between the template and recipient substrate to be aided by metal "guides." The guides are bound to the surface of both the template and substrate and to an organic thiol group.

Figure 10:
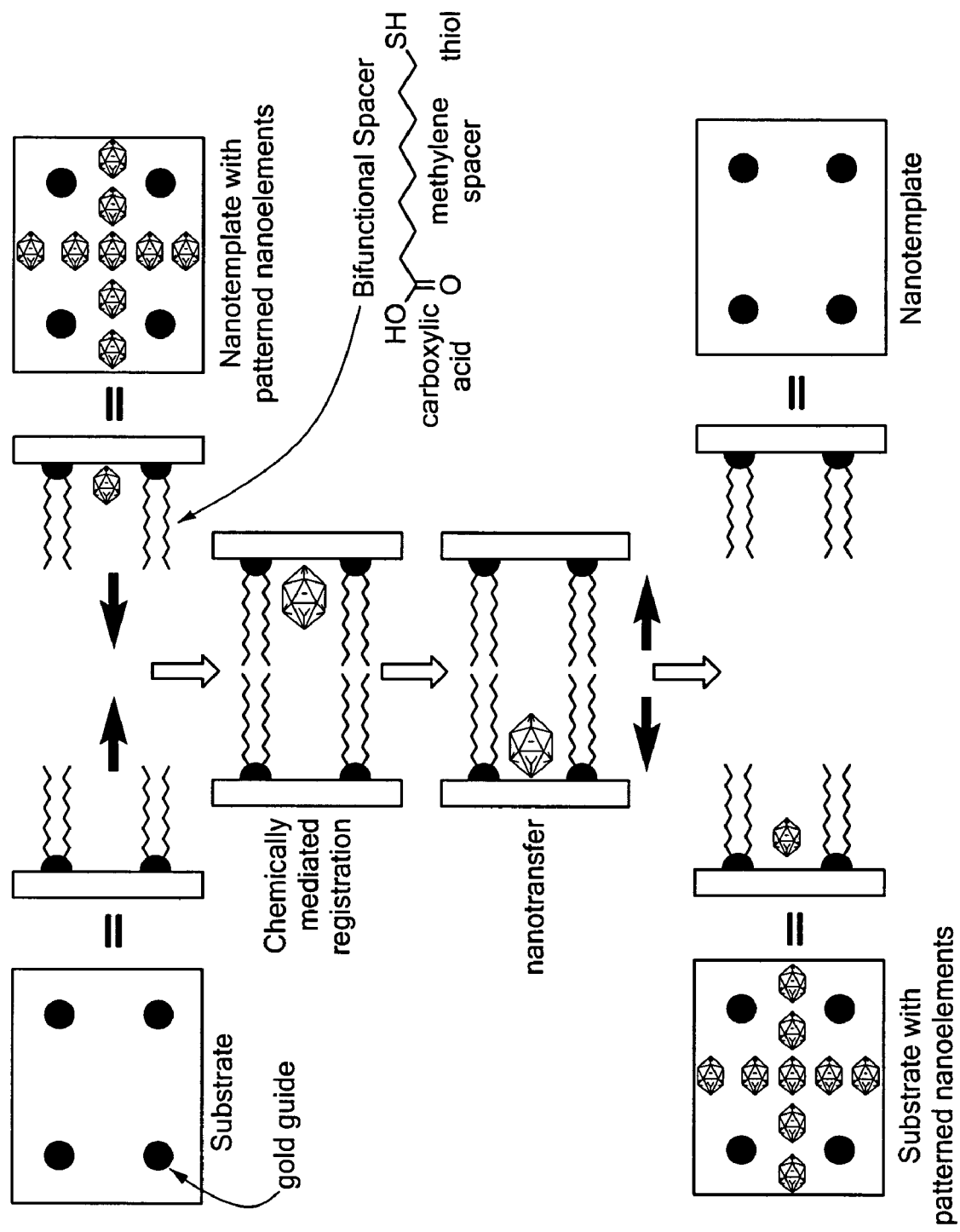
FIG. 10 is a representation of a scheme for aligning and transferring the modified nanoelements of FIG. 8 to a recipient substrate using bifunctional spacers as guides.

As illustrated in FIG. 10, the organic thiol is part of a bifunctional spacer which is bound at one end to the metal guide and has a carboxylic acid substituent on the opposite end. The length of each spacer and its substituent group can be changed depending on the type of guide or substrate materials used. For example, the carboxylic acid group could be substituted with an alcohol, amine, amide or thiol. The bifunctional spacers operate through attractive forces to align the nanotemplate with the substrate and fix their equilibrium separation distance. These attractive forces can include, but are not limited to, hydrogen bonding.

The scheme illustrated in FIG. 10 shows the bifunctional spacers of the nanosubstrate interacting with those of the recipient substrate. As described above, attractive forces act to align and fix the template with respect to the substrate, allowing the nanoelements to be transferred to the recipient substrate. The nanotemplate can then be removed from contact with the substrate by cleaving the hydrogen bonds, yielding a three-dimensional nanostructure on the recipient substrate. It is preferable in this scheme for the nanoelements to be more strongly attracted to the substrate than the nanotemplate.

The invention is also directed to methods for functionalizing a nanosubstrate. These methods involve providing a substrate having a known topology and polymerizing a monomer on its surface. Methods for selecting nanoelements and guiding their self-assembly are further disclosed. Finally, the invention contemplates a method for modifying and transferring assembled nanoelements to a recipient substrate.

While the present invention has been described in conjunction with a preferred embodiment, one of ordinary skill in the art, after reading the foregoing specification, will be able to effect various changes, substitutions of equivalents and other alterations to the compositions and articles set forth herein. It is therefore intended that the protection granted by Letter Patent hereon be limited only by the definitions contained in the appended claims and equivalents thereof.

What is claimed is:

1. A functionalized nanosubstrate for the guided self-assembly of nanoelements, the functionalized nanosubstrate comprising:
a nanosubstrate having a surface, wherein the surface is defined by a known topology;
a layer of monomer polymerized on the surface of the nanosubstrate, the layer preserving the topology of the surface;
a plurality of channels formed on the nanosubstrate by the layer, the channels corresponding to the preserved topology of the nanosubstrate surface, wherein the channels functionalize the nanosubstrate to selectively assemble a plurality of nanoelements; and
a plurality of metal guides attached to the surface of the nanosubstrate, the guides aiding the alignment of the functionalized nanosubstrate with a nanotemplate for the transfer of said nanoelements from the nanotemplate to the functionalized nanosubstrate.

2. The functionalized nanosubstrate of claim 1, wherein the nanosubstrate is a metal.

3. The functionalized nanosubstrate of claim 1, wherein the nanosubstrate is substantially a metal selected from the group consisting of yttrium, zirconium, niobium, molybdenum, titanium, chromium, manganese, iron, cobalt, nickel, copper, zinc, gallium, aluminum, ruthenium, rhodium, palladium, silver, cadmium, indium, tin, tungsten, iridium, platinum, gold and combinations thereof.

4. The functionalized nanosubstrate of claim 1, wherein the nanosubstrate is a metal, the metal having a face centered cubic or hexagonal closed packed structure.

5. The functionalized nanosubstrate of claim 1, wherein the nanosubstrate is substantially a semi-metal selected from the group consisting of boron, silicon, germanium and combinations thereof.

6. The functionalized nanosubstrate of claim 1, wherein the substrate is substantially a combination of metals and semi-metals.

7. The functionalized nanosubstrate of claim 1, wherein the known topology of the nanosubstrate surface features a plurality of depressions.

8. The functionalized nanosubstrate of claim 7, wherein the plurality of depressions are sulfur vacancy islands.

9. The functionalized nanosubstrate of claim 1, wherein the known topology of the nanosubstrate surface features a plurality of protuberances.

10. The functionalized nanosubstrate of claim 9, wherein the plurality of protuberances are cobalt nanoclusters.

11. The functionalized nanosubstrate of claim 1, wherein the polymer is capable of having a binding interaction with the plurality of nanoelements.

12. The functionalized nanosubstrate of claim 1, wherein the polymer is polymerized from an organic monomer.

13. The functionalized nanosubstrate of claim 12, wherein the organic monomer is capable of pi-stacking.

14. The functionalized nanosubstrate of claim 12, wherein the organic monomer contains an aromatic group.

15. The functionalized nanosubstrate of claim 12, wherein the organic monomer contains a thiol functional group.

16. The functionalized nanosubstrate of claim 12, wherein the organic monomer is

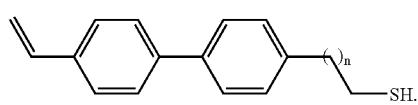

17. The functionalized nanosubstrate of claim 12, wherein the organic monomer is polymerized by a polymerization method selected from the group consisting of free radical polymerization, photopolymerization, anionic polymerization and cationic polymerization.

18. The functionalized nanosubstrate of claim 12, wherein the organic monomer is polymerized by photopolymerization.

19. The functionalized nanosubstrate of claim 14 or 15, wherein the organic monomer is polymerized by photopolymerization.

20. The functionalized nanosubstrate of claim 1, wherein the polymer has a binding interaction with the surface of the nanosubstrate.

21. The functionalized nanosubstrate of claim 11, wherein the binding interaction is noncovalent.

22. The functionalized nanosubstrate of claim 11, wherein the polymer is cured, photocured or thermally set.

23. The functionalized nanosubstrate of claim 1, further comprising as a system a plurality of nanoelements suitable for self-assembly in one or more channels of said nanosubstrate.

24. The functionalized nanosubstrate of claim 1, further comprising a plurality of bifunctional spacers having first and second functional groups, the first functional groups bound to said metal guides, and the second functional groups capable of binding to said nanotemplate.

25. The functionalized nanosubstrate of claim 24, wherein the metal guides comprise gold and the first functional groups are thiol groups.

26. The functionalized nanosubstrate of claim 24, wherein the second functional groups are selected from the group consisting of carboxylic acid, alcohol, amine, amide, and thiol groups.

* * * * *